United States Patent
Shapiro et al.

(10) Patent No.: US 7,220,967 B1
(45) Date of Patent: May 22, 2007

(54) METHOD AND APPARATUS FOR DETECTION OF RADIOACTIVE MATERIAL

(75) Inventors: Dale F. Shapiro, Chagrin Falls, OH (US); Jerry Bohinc, Jr., Gate Mills, OH (US)

(73) Assignee: Quintell of Ohio, LLC, Gates Mills, OH (US)

( * ) Notice: Subject to any disclaimer, the term of this patent is extended or adjusted under 35 U.S.C. 154(b) by 52 days.

(21) Appl. No.: 10/909,922

(22) Filed: Aug. 2, 2004

Related U.S. Application Data

(60) Provisional application No. 60/494,858, filed on Aug. 13, 2003.

(51) Int. Cl.
*G01T 1/16* (2006.01)
*G01T 3/00* (2006.01)
*G08B 1/08* (2006.01)

(52) U.S. Cl. .................... 250/358.1; 250/394
(58) Field of Classification Search ........... 250/394, 250/358.1
See application file for complete search history.

(56) References Cited

U.S. PATENT DOCUMENTS

| | | | |
|---|---|---|---|
| 4,663,625 A | | 5/1987 | Yewen |
| 5,347,274 A | * | 9/1994 | Hassett ................ 340/988 |
| 5,442,672 A | * | 8/1995 | Bjorkholm et al. .......... 378/4 |
| 5,485,154 A | | 1/1996 | Brooks et al. |
| 5,557,108 A | * | 9/1996 | Tumer ................ 250/390.04 |
| 5,615,247 A | | 3/1997 | Mills |
| 5,828,220 A | | 10/1998 | Carney et al. |
| 5,939,982 A | | 8/1999 | Gagnon et al. |
| 5,982,838 A | | 11/1999 | Vourvopoulos |
| 6,031,454 A | | 2/2000 | Lovejoy |
| 6,356,802 B1 | | 3/2002 | Takehara et al. |
| 6,429,810 B1 | | 8/2002 | DeRoche |
| 2003/0137968 A1 | * | 7/2003 | Lareau et al. ................ 370/349 |

(Continued)

FOREIGN PATENT DOCUMENTS

HU 72784 5/1996

(Continued)

OTHER PUBLICATIONS

Canberra web-site <http://www.canberra.com/products/538.asp>, "ADM-606M Multi-Purpose Radiation Monitor" product description.

(Continued)

*Primary Examiner*—Albert Gagliardi
(74) *Attorney, Agent, or Firm*—Akin Gump Strauss Hauer & Feld LLP

(57) ABSTRACT

A radioactive material detection system includes a plurality of radioactive material detection apparatuses and a command center. Each apparatus is disposed in or on a cargo receptacle. Each apparatus includes a wireless transmitter, a radiation sensor, a detection controller and an identification tag. The radiation sensor is configured to detect radiation over a predetermined or commanded period of time. The command center is configured to receive the wirelessly transmitted information directly or indirectly from each of the wireless transmitters of the plurality of radioactive material detection apparatuses. The system is configured to detect fissile or nuclear material that emits radiation. The system is reconfigurable from a passive sensing system to an at least partially active sensing system in the event that the system detects a nuclear anomaly within a cargo receptacle.

25 Claims, 3 Drawing Sheets

U.S. PATENT DOCUMENTS

| | | | |
|---|---|---|---|
| 2003/0149526 A1 | 8/2003 | Zhou et al. | |
| 2003/0201394 A1* | 10/2003 | Peoples | 250/336.1 |
| 2004/0113775 A1 | 6/2004 | Bohinc | |
| 2004/0212499 A1 | 10/2004 | Bohinc | |
| 2004/0233055 A1* | 11/2004 | Canich et al. | 340/539.26 |
| 2004/0256565 A1* | 12/2004 | Adams et al. | 250/358.1 |
| 2004/0257225 A1* | 12/2004 | Webb, Sr. | 340/539.26 |
| 2006/0081782 A1* | 4/2006 | Guillebaud et al. | 250/360.1 |
| 2006/0097171 A1* | 5/2006 | Balchunas et al. | 250/336.1 |

FOREIGN PATENT DOCUMENTS

| | | |
|---|---|---|
| HU | 220207 B | 11/2001 |
| JP | 05-40191 | 2/1993 |

OTHER PUBLICATIONS

Dye, David H., "*Sensors for Screening and Surveillance,*" <http://www-hoover.stanford.edu/research/conferences/nsf02/dye.pdf>, presented at the Hover Institute National Security Forum, "Conference on Technology for preventing Terrorism," Mar. 2003.

ORTEC web-site <http://www.ortec-online.com/detective.htm>, "Detective" product description.

"Gamma Ray Gauging," *IBM Technical Dislcosure Bulletin*, Mar. 1971, p. 2864.

Cuneo, Eileen C., Informationweek.com web-site http://www.informationweek.com/story/Article.jhtml?articleID=8700375, "Safe At Sea", Apr. 7, 2003.

It's China web-site http://china.tyfo.com/china/block/html/2003022600680.html , "U.S. Ports Vulnerable to Attack—Intelligence", Aug. 13, 2003.

Lawrence Livermore National Laboratory Radiation Detection Center web-site www.llnl.gov/llnl/06news/handouts/radiation_det_ctr.pdf , "Technology Fact Sheet".

Report "Ambient Background Measurements for At-Sea Radiation Detection Applications," Smith et al., Prepared for the U.S. Department of Energy under contract DE-AC06-76RL01830 by Pacific Northwest National Laboratories (PNNL), Jan. 2003 (30 pages).

* cited by examiner

METHOD AND APPARATUS FOR DETECTION OF RADIOACTIVE MATERIAL

CROSS REFERENCE TO RELATED APPLICATIONS

This application claims the benefit of U.S. Provisional Patent Application No. 60/494,858 filed Aug. 13, 2003, entitled "Method and Apparatus for Detection of Radioactive Material," the entire contents of which is incorporated by reference herein.

BACKGROUND OF THE INVENTION

The present invention relates generally to a method and apparatus for the detection of radioactive material and, more particularly, to a method and apparatus for detecting the presence of radioactive material within a vessel or container during shipment from one location to another.

There is a growing concern that terrorists or others may at some time in the near future attempt to import into the United States or some other country radioactive or nuclear material which may then be used for the construction of a nuclear weapon for carrying out terrorist objectives. One way of shipping such radioactive or nuclear material is to hide the material among or within seemingly innocuous cargo. For example, such nuclear material could be placed within a standard, sealed cargo container of the type typically employed for shipping cargo by sea, rail, air or by truck. The nuclear material could be positioned within such a sealed cargo container along with other innocuous goods with the container being positioned, for example, within the hold of a large container ship which may be transporting a thousand or more such containers from one location to another. Typically, existing cargo inspection systems are employed either at the port of debarkation or the port of entry for such container ships. Because of the large number of containers which are typically transported by a single large container ship, it is difficult, if not impossible, using the presently available inspection equipment and personnel to thoroughly check each and every container for the presence of any type of contraband, including radioactive or nuclear material. To beef up the inspection equipment and personnel at ports of entry to facilitate a more thorough or detailed inspection of each container is not practical because of the time involved in inspecting each such container and the unacceptable delays in the transport of the containers, as well as potential huge back ups in the loading and unloading of the container ships.

The present invention overcomes the problems associated with the existing container inspection systems by providing a method and apparatus for the detection of radioactive or nuclear material within a sealed container while the container is in transit from one location to another. In this manner, it is possible to identify potential threats while in transit to permit appropriate action to be taken long before the radioactive or nuclear material enters the territorial limits of a country.

BRIEF SUMMARY OF THE INVENTION

Briefly stated, the present invention comprises a radioactive material detection system that includes a plurality of radioactive material detection apparatuses and a command center. Each apparatus is disposed in or on a cargo receptacle. Each apparatus includes a wireless transmitter capable of wirelessly transmitting information in correspondence with a signal, a radiation sensor having a sensor output, a detection controller configured to receive the sensor output from the radiation sensor and to send the signal to the wireless transmitter for transmission, and an identification tag electrically coupled to one of the controller and the wireless transmitter. The radiation sensor is configured to detect radiation over a predetermined or commanded period of time, and the identification tag is configured to provide identification data or location data to the information being transmitted by the wireless transmitter. The command center is configured to receive the wirelessly transmitted information directly or indirectly from each of the wireless transmitters of the plurality of radioactive material detection apparatuses. The system is configured to detect fissile or nuclear material that emits radiation by establishing a background radiation space derived from the information sensed by the plurality of radioactive material detection apparatuses to distinguish an anomaly amongst the plurality of radioactive material detection apparatuses. The system has an adjustable sensitivity.

In another aspect, the present invention comprises a radioactive material detection apparatus that includes a plurality of radioactive material detection apparatuses and a command center. Each apparatus is disposed in or on a cargo receptacle. Each apparatus includes a wireless transmitter capable of wirelessly transmitting information in correspondence with a signal, a radiation sensor having a sensor output, a detection controller configured to receive the sensor output from the radiation sensor and to send the signal to the wireless transmitter for transmission, and an identification tag electrically coupled to one of the controller and the wireless transmitter. The radiation sensor is configured to detect radiation over a predetermined or commanded period of time, and the identification tag is configured to provide identification data or location data to the information being transmitted by the wireless transmitter. The command center is configured to receive the wirelessly transmitted information directly or indirectly from each of the wireless transmitters of the plurality of radioactive material detection apparatuses. The system is configured to detect fissile or nuclear material that emits radiation by establishing a background radiation space derived from the information sensed by the plurality of radioactive material detection apparatuses to distinguish an anomaly amongst the plurality of radioactive material detection apparatuses. The radioactive material detection system is reconfigurable from a passive sensing system to an at least partially active sensing system in the event that the system detects a nuclear anomaly within a cargo receptacle.

The present invention also comprises a method of detecting radioactive material within a plurality of cargo receptacles using a radioactive material detection system. The radioactive material detection system includes a command center and a plurality of radioactive material detection apparatuses. Each apparatus has a transmitter, a detection controller and a radiation sensor configured to detect radiation over a predetermined or commanded period of time. The system has an adjustable sensitivity. The method includes sensing radiation at each radioactive material detection apparatus; receiving sensed information from each radioactive material detection apparatus at the command center, over the predetermined or commanded period of time; and adjusting for background or cosmic radiation to facilitate the identification of an anomaly or unusual data which is likely to indicate the presence of nuclear radioactive material.

BRIEF DESCRIPTION OF THE SEVERAL VIEWS OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
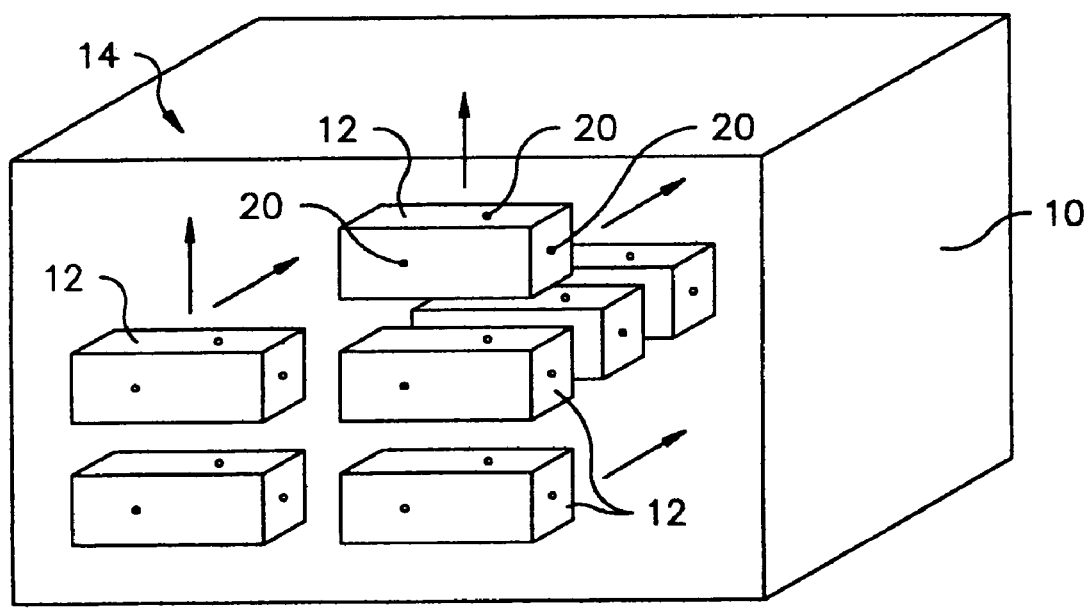
FIG. 1 is a functional block diagram of radioactive material detection system having a plurality of radioactive material detection apparatuses arranged on a plurality of objects to be tested which are arranged in a three-dimensional matrix.
Figure 2:
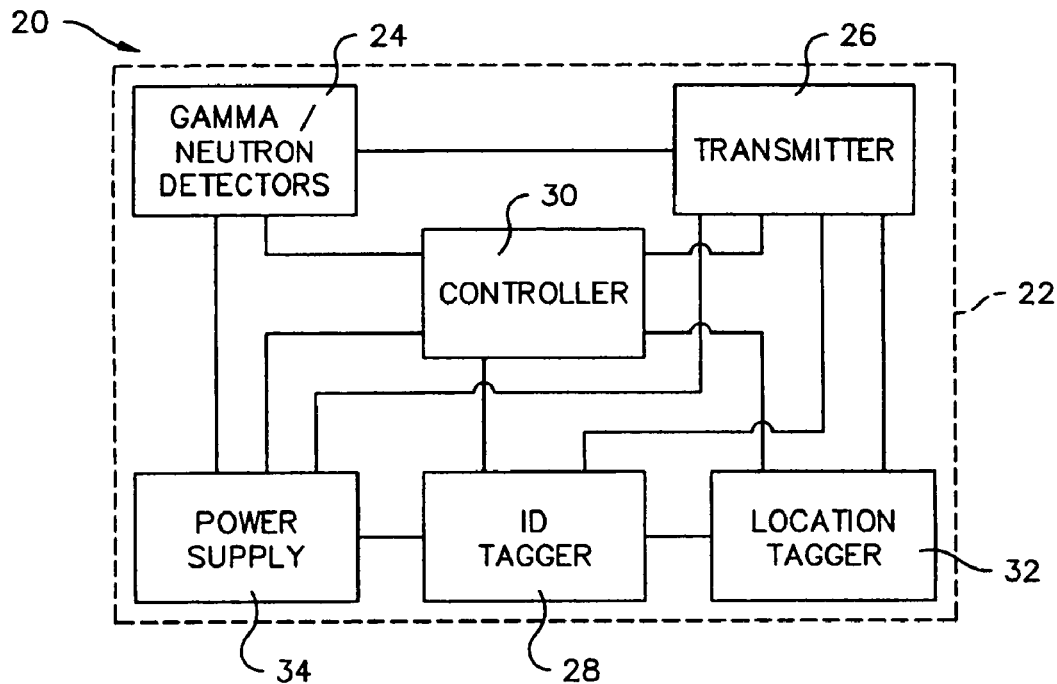
FIG. 2 is a schematic functional block diagram of a radioactive material detection apparatus in accordance with a preferred embodiment of the present invention.
Figure 3:
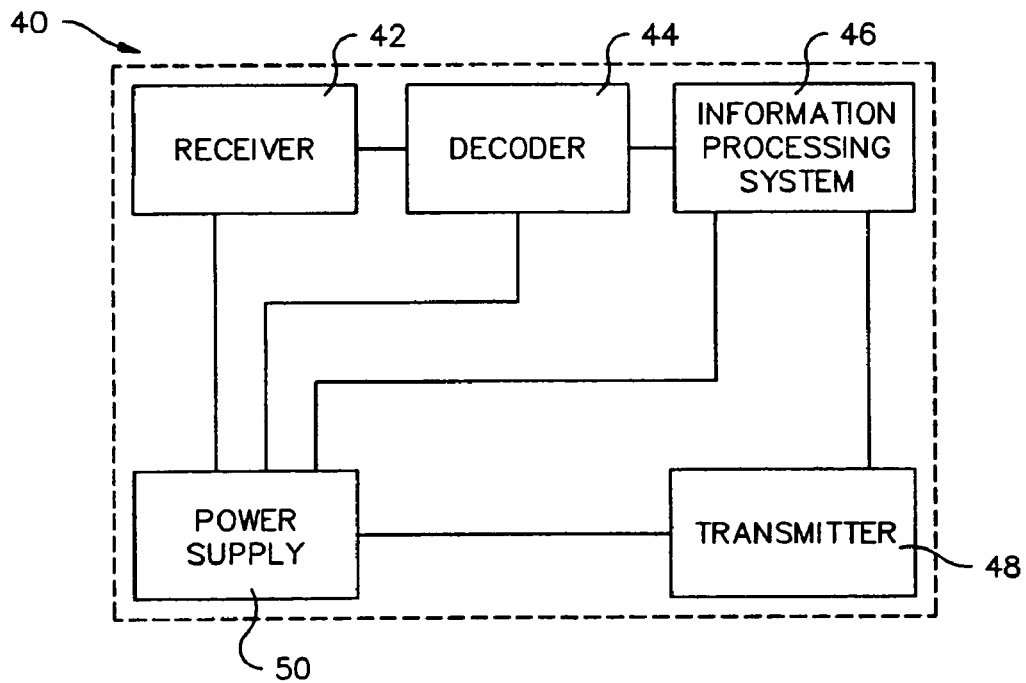
FIG. 3 is a schematic functional block diagram of a master unit/master module or receiver station in accordance with a preferred embodiment of the present invention.

Referring to the drawings, wherein the same reference numerals are employed for indicating like elements throughout the several figures, there is shown in FIGS. 1–3, a schematic representation of a radioactive material detection system 10 in accordance with the present invention. The radioactive material detection system 10 (FIG. 1) includes a plurality of radioactive material detection apparatuses 20 (FIG. 2) and a master unit/master module 40 (FIG. 3). Each radioactive material detection apparatus 20 includes a transmitter 26, a radiation detector or sensor 24, a detection controller 30 and an identification tag or ID tagger 28. Each transmitter 26 is capable of transmitting information in correspondence with a signal. Preferably, the transmitter 26 transmits information using radio frequency, infrared, light waves, microwaves, electrical voltage, electrical current and the like. Each radiation sensor 24 has a sensor output and is configured to detect radiation over a predetermined period of time. Preferably, the radiation sensor 24 is configured to vary the sensor output in proportion to an amount of radiation detected. The amount of radiation detected may be an amount of intensity or a cumulative value as sensed over a predetermined period of time. Each detection controller 30 is configured to receive the output from its associated radiation sensor 24 and to send its respective output signal to its respective transmitter 26 for transmission. Each identification tag 28 is electrically coupled to at least one of the controller 30 and the transmitter 26 and is configured to provide identification data and/or location data to the information being transmitted by the transmitter 26. The identification data may include a unique identifier for an object to be tested 12, and may additionally include information about the contents, ownership, source and/or destination of the object to be tested 12. Preferably, the radiation sensor 24 varies the sensor output in proportion to an amount of radiation detected.

The master unit/master module 40 includes a receiver 42, an indication output such as transmitter 48 of the master control unit 40 and a master controller or information processing system 46. The receiver 42 is configured to receive the transmitted information from each of the transmitters 26 of the radioactive material detection apparatuses 20. The master controller 46 is coupled to the receiver 42 and is configured to drive an indication output or transmitter 48 based upon a status of the information received. The indication output 48 may be connected to a remote or local indicator light, annunciator panel, display device, sound generating device (i.e., a horn or a buzzer), and the like. Alternatively, the indicator output 48 may be a transmitter connected to a remote communication system (see FIG. 4 for example) such as a cellular system, a telephonic system, a wired computer network, a satellite system, a radio system and the like.

Preferably, a plurality of subsets of the plurality of radioactive material detection apparatuses 20 are arranged on a plurality of objects to be tested 12, as depicted in FIG. 1, and the plurality of objects to be tested 12 are arranged such that subsets of the plurality of radioactive material detection apparatuses 20 arranged on adjacent objects to be tested 12 are capable of detecting at least a portion of other adjacent objects to be tested 12 nearest thereto. For example, a first subset of the plurality of radioactive material detection apparatuses 20 may be arranged on a first object to be tested 12 and a second subset of the plurality of radioactive material detection apparatuses 20 may be arranged on a second object to be tested 12. The first and second objects to be tested 12 are arranged such that the first subset of the plurality of radioactive material detection apparatuses 20 is capable of detecting at least a portion of the second object to be tested 12 and vice versa. Preferably, at least three of the plurality of radioactive material detection apparatuses 20 are arranged on each object to be tested 12 and are oriented on the object to be tested 12 in a manner that minimizes the distance from any point within the object to be tested 12 to one of the three radioactive material detection apparatuses 20. It is contemplated that a plurality of radioactive material detection systems 10 can be inter-connected by a supervisory monitoring or control station for monitoring a plurality of floors, areas, buildings, holds and the like.

In one possible implementation, FIG. 1 may be a schematic representation of the hold of a typical container ship 100 of a type well known to those of ordinary skill in the art. As shown in FIG. 1 container ship 100 is employed for receiving within its hold and, in some cases upon its deck, a plurality of box-like containers or other objects to be tested 12 generally of a predetermined size of approximately 10 feet by 10 feet by 40 feet. The containers 12 are preloaded with goods to be shipped from one location to another before being loaded onto the container ship 100. Typically, the containers 12 preloaded with the goods to be shipped are sealed before being placed on the container ship 100. The hold of the container ship 100 is sized for receiving a plurality of such containers 12 in a side by side, end to end relationship with other containers 12 being stacked one on top of another to effectively establish a three dimensional container matrix 14 to take advantage of the available space of the container ship 100 for maximum shipping efficiency. The containers 12 are typically made of steel or some other rigid, high strength material in order to provide adequate support for the overlying containers 12 and to adequately protect the goods being shipped within each container 12 from damage which may occur during shipment and the loading/unloading of the containers 12. A typical large container ship 100 may receive one thousand or more containers 12 for shipping from one location to another. As mentioned above, because of the size of the containers 12 and the number of containers 12 on each container ship 100, it is difficult if not impossible to adequately inspect each and every container for contraband, including radioactive material, at the time the containers 12 are being unloaded from the container ship 100 for further transport.

The present invention provides a method and system for detecting the presence of radioactive or nuclear material within such containers 12 on a container ship 100 (or in some other mode of transport) as the ship 100 is transporting the containers 12 from one location to another such as a source port S to destination port D and/or a plurality of intermediate ports. Typically, the ocean transit time of a container ship 100 is at least several days and could be as many as ten or more days from the time a loaded container ship 100 leaves a port at a first location until the time that the container ship 100 enters a port at a second location. For shipments between Western Europe and the United States, a typical transit time is in the range of nine to eleven days for an east coast U.S. port. The present invention takes advantage of the relatively long transit time to facilitate an orderly, thorough detection of the presence of radioactive or nuclear material within a container 12 without creating any unacceptable delays or port congestion either at the departure or arrival port of the container ship 100. In this manner, appropriate action may be taken while the ship 100 is still out to sea, long before approaching or entering a port. In addition, because the presence of nuclear or radioactive material can be detected while the ship 100 is at sea, the ship 100 can be held outside of a destination port D to prevent entry of the material into a country or may be diverted to a safe harbor for further inspection.

FIG. 2 is a functional schematic block diagram of the sensor apparatus 20 in accordance with a preferred embodiment of the present invention. The sensor apparatus 20 is contained within a housing 22 which is preferably sealed and is made of a generally rigid high strength material such as a polymeric material. Preferably, the sensor housing 22 is tamper resistant and includes a mechanism for identifying by a quick, visual or other inspection whether the housing 22 has been opened or otherwise tampered with and or an internal electronic means to detect tampering. The housing 22 is adapted to be secured to the inside or outside of a container 12 at a predetermined location. Various techniques and methods well known to those of ordinary skill in the art may be employed for securing the housing 22 to the container 12 including the use of one or more mechanical fasteners such as screws, bolts, clamps, etc., the use of an adhesive or epoxy adhesive, suction cups, a magnetic attachment device or any other suitable attachment device or technique. Preferably, the housing 22 is adapted to be temporarily secured to an interior or exterior surface of the container 12. Thus, the radioactive material detection apparatus 20 may be a portable unit. However, it is within the scope and spirit of the present invention that the housing 22 be permanently secured to a container 12. Preferably, the location on the container 12 where the housing 22 is secured will be such that the housing 22 will not affect the loading or unloading of the container 12 or the stacking of the containers 12 in the three dimensional matrix 14. Preferably, the housing 22 is relatively small as compared to the container 12 or other object to be tested.

Referring again to FIG. 2, the housing 22 contains the components necessary for passive detection of the presence of radioactive material over the time period during which the container ship 10 moves from one port to another. In the present embodiment, the housing 22 includes a gamma radiation detection sensing component or sensor 24, a transmitter 26, an identification component or ID tagger 28, a controller 30, a location component or tagger 32 and a power source 34 for providing operating power to the other components as needed. Preferably, the gamma radiation sensor component 24 is a self-contained passive device capable of sensing the presence of gamma radiation emitted from radioactive material which may be present within or near the container 12 to which the sensor apparatus 20 is attached. The gamma radiation sensing component 24 is preferably of a type which is generally well known to those of ordinary skill in the art and is available from several sources. The gamma radiation sensing component 24 provides an electrical output signal which is proportional to the sensed gamma radiation. The output from the gamma radiation sensing component 24 is supplied as an input to the transmitter 26. The output of the radiation sensor 24 may also be accumulated over a predetermined or commanded intervals of time prior to transmission to transmitter 26. Suitable signal conditioning components (not shown) may be interposed between the gamma radiation sensing component 24 and the transmitter 26.

The purpose of the gamma radiation sensing component 24 is to maximize sensitivity and thus the detection of counterband radioactive or nuclear material (fissile material). However, sensitive gamma ray detectors may also be sensitive to particular radioactive isotopes occurring naturally as trace elements within certain commercially acceptable materials. Potassium 40 which occurs in potassium based fertilizer as well as the decay products of trace radioactivity in clay are examples of commercially acceptable materials which may be detected by the gamma radiation sensing component 24. Man-made radioactive materials intended for use in medical or industrial applications which may also be legally shipped in cargo containers could also be detected. Thus, the detection by the gamma radiation sensing component 24 of the present system could constitute false detection of apparently clandestine fissile material.

One way to minimize the occurrence of such false positive detections is by using a separate detector which is sensitive to neutrons, along with the gamma radiation sensing component 24. The vast majority of naturally occurring radioactive elements and of man-made radioactive isotopes do not emit neutrons whereas fissile materials do emit neutrons. In this manner, simultaneous monitoring using the gamma radiation sensing component 24 along with a neutron monitoring component permits differentiation between the fissile materials and other radioactive sources.

Another way of identifying potential false positive detections by the gamma radiation sensing component 24 is by also detecting gamma-ray spectral characteristics. Each radioactive isotope emits gamma rays having an identifiable characteristic energy spectrum. By detecting the gamma ray spectrum, the specific source material can be easily identified. Detection can be registered as a spectral continuum or more simply in properly chosen discreet energy bins. Detectors and associated electronics that register radiation in specific energy windows are commercially available. For example, potassium 40 with an energy peak of 1.466 MEV can be readily distinguished from other isotopes and particularly from fissile materials having different energy peaks. Other naturally occurring and man-made isotopes can be distinguished in the same manner. The presence of heavy shielding (e.g., "high Z material") between the radiation source and the detector can potentially degrade and smear the characteristic spectral lines and thus lessen the usefulness of spectral identification. However, commercially acceptable, legitimately shipped naturally occurring materials, such as potassium, are likely to be uniformly distributed in the cargo containers and not deliberately shielded. Hence, some of the radiation will still reach the detector unobstructed and will thus provide a means of detecting the associated energy spectrum and identifying signature. Manmade radiation sources also have characteristic radiation signatures and ideally will be declared on the shipping manifest to facilitate the occurrence of false positive detections.

Although the sensing component 24 employed in connection with the present invention is extremely sensitive, in part due to the long detection times and highly sensitive detector structure, massive deliberate shielding of the interior of all or part of a container 12 remains a potential concern. For such shielding to be most effective, it must contain both gamma and neutron attenuating components. Gamma attenuating materials must be very dense and of a high atomic number, such as lead or a similar dense material. On the other hand, neutron attenuating materials must be of a low atomic weight but of a large volume. The conflicting shielding requirements between gamma radiation and neutrons are impractical in terms of both the container weight and volume constraints. To meet the weight constraints, the high density shielding required for gamma radiation must be concentrated right around the fissile material. This results in a disproportionately high weight to moment of inertia ratio for the container 12. As a result, massive shielding within a container 12 can be detected by measuring the weight to moment of inertia ratio of the container 12. Any container 12 having an unusually high weight to moment of inertia ratio is likely to have deliberate shielding and can be identified for further analysis. Thus, when the measured moment of inertia varies by a predetermined deviation amount, the detection controller 30 or the master unit/master module 46 may determine that heavy shielding is being used within a particular object to be tested 12. To preclude degradation of the sensitivity of the gamma radiation sensing component 24 due to massive shielding, the present invention includes equipment (not shown) for measuring the mass and at least one but preferably three moments of inertia of each cargo container 12 at the port of embarkation, prior to loading the container 12 onto the container ship 100. Thus, measurement of a threshold mass/moment of inertia concentration can be considered to be a probable detection of a false negative condition.

Alternatively, a rotational inertia test may be performed on each container 12 being shipped. The rotational inertia test comprises simply raising one or more edges of the container 12 and measuring the movement and/or acceleration for a given lifting force. The test may be performed along one or more axes. The density of any shielding material may be determined using a simple algorithm along with the measured test data and the total weight of the container 12. The calculation provides an indication of how concentrated the total weight of the container 12 may be—a concentrated weight may be high density shielding (i.e., "high Z material" or the like). Thus, when the measured rotational inertia varies by a predetermined deviation amount, the detection controller 30 or the master unit/master module 46 may determine that heavy shielding is being used within a particular object to be tested 12. This technique may be used to test for false negation in detection systems used for ship borne containers, trucks, cares, airline cargo containers and in almost any other shipping environments or non-shipping environment in which details of the contained material may be obscured from observation or might not otherwise be available.

A neutron detector or any other suitable sensor could be employed instead of or in addition to the gamma radiation sensing component 24. If a neutron detector is used in conjunction with the gamma radiation sensing component 24 both types of emissions would be measured with the measured information being provided on separate channels or multiplexed over a single channel. In addition, the gamma radiation sensing component 24, neutron detector and/or other sensor would have self diagnostics to periodically confirm proper functionality and to provide an indication of any potential tampering and/or damage. The lack of an appropriate output signal from a gamma radiation sensing component 24, neutron detector or other sensor would suggest that the associated container 12 could be suspect.

The transmitter 26 is adapted to receive the output signal from the gamma and/or neutron radiation sensing component 24 and to transmit the signal in a manner well known to those of ordinary skill in the art. Preferably, the transmitter 26 is of the radio frequency type. However, it will be appreciated by those of ordinary skill in the art that the transmitter 26 may be of some other type such as an infrared or acoustic transmitter. Alternatively, the transmitter 26 may be of a type used in connection with satellite transmissions and/or a type used with cellular telephones. Alternatively, the transmitter 26 may use a spread spectrum or other efficient commercial communications method to facilitate transmission to and/or from a plurality of transmitters 26 arranged in an array, a matrix, a cluster and the like. Alternatively, the transmitter 26 may be a part of a transceiver, with the capability of sending as well as receiving signals. Any received signals would be routed to the controller 30 for execution of the received commands. The precise type of transmitter 26 employed should not be considered to be a limitation on the present invention. Preferably, the transmitter 26 includes a built in antenna or other transmitting element. Alternatively, a separate antenna (not shown) may be employed.

The identification component or ID tagger 28 is also connected to the transmitter 26 for the purpose of transmitting identification information. Preferably, each sensor apparatus 20 can be uniquely identified utilizing the identification component 28 in combination with the transmitter 26. The identification component 28 may use any of a variety of techniques including the use of a particular transmitter frequency, the use of digital identification techniques or the like. Accordingly, the particular techniques or technology used by the identification component 28 should not be considered to be a limitation on the present invention.

A location component or location tagger 32 is also included to permit identification of the physical location of the sensor 20. Again, any standard technique or device known to those skilled in the art may be employed for performing the functions of the location component 32. Location information from the location component 32 is also transmitted by the transmitter 26. Alternatively, the location information may be input to the receiver station (FIG. 3) by bar coding or other means as would be recognized by one skilled in the art.

The controller 30 is employed for controlling the operation of the gamma radiation sensing component 24, the transmitter 26, the identification component 28 and the location component 32. The controller 30 may be a microprocessor, ASIC, or any other suitable known controlling device which has been programmed with software or firmware for providing the necessary control signals to the other components within the sensor apparatus 20. For example, in one embodiment, the controller 30 may control the timing of the transmission by the transmitter 26 of the identification information and/or the information received from the gamma radiation sensing component 24. Moreover, the controller 30 may control the operation of the other components to minimize battery life. Other control schemes or techniques will be apparent to those of ordinary skill in the art.

The power source 34 is preferably a self contained, battery which contains sufficient energy to power the other components within the sensor apparatus 20 for at least the transit time of the container ship 10. Preferably, the battery is of the rechargeable type. However, non-rechargeable batteries may alternatively be employed. The power source 34 also includes the necessary protection circuitry for the battery including a voltage regulator, short circuit protection, etc., as well as the necessary circuitry for recharging the battery. Although in the presently preferred embodiment a battery is employed as the primary power source, it will be appreciated by those of ordinary skill in the art that other power sources may be employed such as solar cells or the like. It will also be appreciated by those of ordinary skill in the art that external power may be supplied to the sensor apparatus 20 on a periodic basis to permit a form of "burst" transmission of the data obtained by the gamma radiation sensing component 24. Accordingly, it will be appreciated by those of ordinary skill in the art that any suitable power source may alternatively be employed.

As previously stated, the housing 22 containing the various components of the sensor apparatus 20 is adapted to be secured to a container 12. FIG. 1 illustrates a container in which three separate sensor apparatuses 20 are secured at three spaced locations on different sides of the container 12. In particular, a first sensor apparatus 20 is secured to a first side panel of the container approximately one third of the distance from a first end, a second sensor apparatus is secured to an end panel of the container 12 and a third sensor apparatus 20 is secured to a top panel of the container 12 approximately one third of the distance from the second end of the container 12. Alternatively, the first and third sensor apparatuses 20 can be affixed on the same side of the container. By positioning the three sensor apparatuses 20 in this manner, complete coverage of the interior of the container 12 and the surrounding vicinity may be obtained. It will be appreciated by those skilled in the art that a lesser or greater number of sensor apparatuses 20 may be used for a container 12, for example, one for each container 12. Additionally, a single sensor apparatus 20 may be used for detecting the presence of nuclear material in two or more containers.

As discussed above, the primary concept of the present invention involves detecting the presence of radioactive or nuclear material within a container 12 during transit to take advantage of a longer detection time and to prevent entry of any nuclear or radioactive material into a country or port. To achieve this result, a receiver station 40 is provided. The receiver station 40 is preferably located on the container ship 10. However, it will be appreciated by those of ordinary skill in the art that the receiver station 40 may be at some other location, such as a land-based location, if desired. All that is necessary is that the receiver station 40 have the ability to receive signals from the transmitter 26 of each sensor apparatus 20 within a container ship 10 either directly or indirectly such as through a satellite link or the like.

As best shown in FIG. 3, the receiver station 40 includes a receiver 42, a decoder 44 and an information processing system 46. The receiver 40 is preferably of the same type as the transmitter 26 so that the receiver 40 is capable of receiving signals transmitted by the transmitter 26 of each sensor apparatus 20. Preferably, the receiver 42 includes a built in antenna or, alternatively, a separate antenna (not shown) may be provided. The receiver 42 receives and demodulates signals received from the transmitter 26 for each of the sensor apparatuses 20. However, special purpose processors may be used as well. The demodulated signals are then fed to a decoder 44 which is also of a type known to those of ordinary skill in the art. The decoder 44 effectively decodes the received signals and converts them to a digital format, sending them to the information processing system 46. In the present embodiment, the information processing system is a personal computer which includes suitable software to permit analysis of the information signals received from each of the sensor apparatuses 20. Preferably the information processing system 46 includes a database which is keyed to each individual sensor apparatus 20 utilizing the identification information provided by the identification component 28 of each sensor. The received information creates a background radiation space. Preferably, the information system 46 receives and stores in the database the information obtained from the gamma and neutron radiation sensing component 24 of each sensor apparatus 20. Alternatively, a command center 220 (FIG. 4) receives and stores a database of the information obtained from each sensor apparatus 20 and/or for each information system 46. The received information from each sensor apparatus 20 permits the information system 46, over time, to make adjustments for background or cosmic radiation to facilitate the identification of anomalies or unusual data which is likely to indicate the presence of radioactive material. Software available within the information processing system 46 analyzes the received information from each gamma and neutron radiation sensing component 24, over time, for the purpose of determining background radiation and any such anomalies which could indicate the presence of radioactive or nuclear material. Typically, the entire set of sensor apparatuses 20 will measure the sum of any signal due to radioactive cargo and the background radiation at each sensor location. The background radiation level can be determined to high accuracy at each sensor location by fitting smooth curves to the radiation curve measured throughout the matrix of containers or objects to be tested and the associated sensor apparatuses 20 attached thereto which thereby creates the aforementioned background radiation space. Deviation in radiation count at any detector or sensor apparatus 20 over the smoothed background radiation level for that position are indications of local radioactivity. If the presence of radioactive or nuclear material is detected, the information processing system 46 transmits an alarm signal either to personnel on board the container ship 100 or to a central facility 220 utilizing an indication output or transmitter 48. The indication output 48 may be a cellular phone, satellite radio, Internet connection, or any other suitable device which may employed for transmitting the alarm signal to the desired location. The information processing system 46 also includes software which uses information from the location component 32 to identify the particular location on the container ship 100 where a sensor apparatus 20 detects the presence of radioactive material using the three dimensional container matrix 14. In this manner, identification of a particular container 12 which may contain radioactive material is facilitated. Transmitter 48 may also have the capability of transmitting command signals to component 26 attached to container 20, if the embodiment of component 26 is a transceiver. Thus, the master unit/master module 40 may be a monitoring device or a controlling device.

It will be appreciated by those of ordinary skill in the art that while a particular preferred embodiment of a system for detecting the presence of radioactive material within a ship board container 12 has been described, the basic concepts of the present invention are applicable in other environments. For example, the same basic techniques and technology may be employed in sensing the presence of radioactive or nuclear material in containers 12 being shipped by other methods such as by rail, air, truck, etc. Further, the same techniques could alternatively be employed for detecting the presence of radioactive or nuclear material in a non-container environment such as non-container, bulk shipments, by merely placing sensor apparatuses 20 at various locations within, for example, the hold of a ship or where bulk shipments are stored for transit. Thus, it will be appreciated by those of ordinary skill in the art that the basic concept of the invention is to make maximum use of the transit time for the purpose of detecting the presence of radioactive material and thereby eliminate or at least minimize the need to check individual containers or bulk shipments upon arrival at a port or other location. The preferred invention may also be utilized for non-modularized bulk shipments, for example on a ship 100, by regular loading and spacing of detector apparatuses 20 to that have larger area of detection and thus greater range of detection. If the arrays have directionality as well, locating the specific point within a larger space can be accomplished via triangulation. Location determination within a ship 100 greatly facilitates intervention. Each module would still be linked to a central relay point as before. The larger arrays would compensate for lessened regularity of the array positioning and will use the transit time for most efficient detection a substantial improvement of detection accuracy and provide for intervention by the inspection authority during transit when flexibility of response is possible.

The whole system transmission can be made more secure by proper encoding of all communications to and from the detection apparatuses 20 and the receiver station 40 and the control center 220 as would be known to one skilled in the art.

Each sensor or detector 24 can be calibrated during production for a particular energy spectrum response as compared to an isotopic element calibration standard. The calibration standard may also be attached or disposed on or near each sensor or detector 24 to serve as a continuous reference for comparison during measurement. Further, the sensors or detectors 24 may also be configured for field calibration or standardization as would be known in the art. Furthermore, each sensor or detector 24 can be operated with an automatic temperature calibration or compensation feature to facilitate consistent performance across a wide range of temperatures.

Performance of the present invention can be further enhanced by utilizing information from the shipping manifest and from other sources 222 (FIG. 4) relating to the type of contents, the shipper, the destination, prior history of the cargo, etc. in combination with the gamma radiation sensing component 24 and related components. One example of the use of such information relates to the manifest of man-made radioactive sources or a threshold concentration of high density as discussed above. The combination of data from the present invention along with information from other sources 222 improves the probability of the detection of fissile material and minimizes the probability of false positives or false negatives. Thus, the present invention includes provisions for merging data from various sources to improve true positive detection and to minimize false positives or false negatives.

The radioactive material detection system 10 described herein may be used in conjunction with, or integrated with other cargo security systems, such as chemical and biological detectors, tamper-proof security systems and information systems that may be used in cargo inspection systems. The radioactive material detection system 10 as described above can also incorporate human sensor technology. For example, an acoustic sensor or microphone, an odor sensor, a motion sensor or any other type of sensor which may detect the presence of humans could be included either within the sensor housing 22 or within a separate housing. Such a sensor could function continuously or could be activated by the controller 30 or by the receiver station 40 to confirm the presence of a human stowaway or "minder" within a container 12. The detection of the presence of a human within a container 12 together with the detection of radioactive material in the container 12 provides additional confirmation of the successful use of the radioactive material detection system 10. Thus, it is contemplated that the present invention can be used in combination with a live being detector configured to detect the presence of a live being within an object to be tested 12, like a container 12 described above.

Successful detection of fissile or "dirty" nuclear waste material is a function of a number of variables: fissile strength, shielding of target, attenuation of target by surrounding material, area of detection devise, and time available for detection. The latter variable, the time of detection, will overcome all other variables in successful detection.

The sensor apparatus 20 could also be used with a GPS system for identifying the location of a container 12, truck, or other object to be tested, etc. to which the sensor apparatus 20 may be secured. In addition, the sensor apparatus 20 may be used to indicate that the seal of a container has been breached.

When the present invention is implemented as a communication-linked system 200 (FIG. 4), the system 200 can also be used to perform other vital and non-vital functions such as commercial GPS locating, protection against clandestine opening of the transportation unit and simple logistical information polling. The linked data can be compared to a database of manifest shipping information to identify the parties involved in the shipment of the target shipment, thus proving for rapid investigation even during transit and to resolve a target identification of legitimate cargo.

Figure 4:
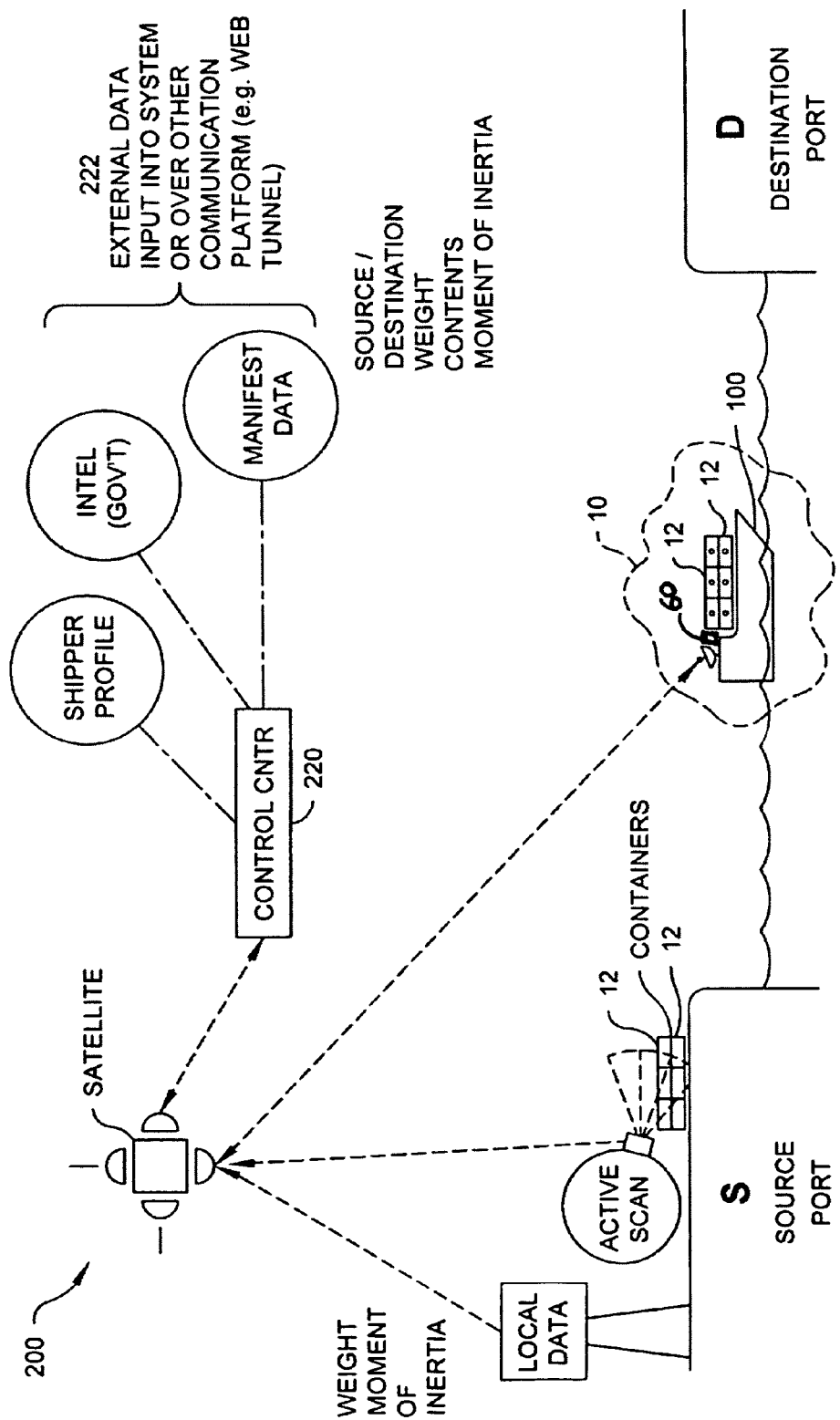
FIG. 4 is a schematic functional block diagram of a command center for monitoring radioactive material detection systems and other information.

FIG. 4 shows that the radioactive material detection system 200 includes a cargo container monitoring system 10 and a control center 220. The cargo container monitoring system 10 includes a plurality of radioactive material detection apparatuses 20 and a master unit/master module 40. The plurality of radioactive material detection apparatuses 20 each have a wireless transmitter 26, a radiation sensor 24 configured to detect radiation over a predetermined or commanded period of time, a detection controller 30 configured to send sensed radiation to the wireless transmitter 26 for transmission and an identification tag 28 electrically coupled to one of the controller 30 and the wireless transmitter 26 and configured to provide identification data or location data to the information being transmitted by the wireless transmitter 26. The master unit/master module 40 has a receiver 42 configured to receive the wirelessly transmitted information from each of the wireless transmitters 26 of the plurality of radioactive material detection apparatuses 20, a transceiver 48 and a master controller 46 coupled to the receiver 42 and configured to send the information received from the radioactive material detection apparatuses 20 through the transceiver 48. The control center 220 is in communication with the transceiver 48 of the master unit/master module 40. The control center 220 is configured to receive data from at least one additional source 222 other than the master unit/master module 40 and to asynchronously analyze the data from the at least one additional source 222 and the information from the radioactive material detection apparatuses 20 so as to detect radioactive material in a particular container 12. The transceiver 48 communicates with the control center 220 by using one or more of a cellular system, a wireless computer network, an infrared system, an ultrasonic system, a satellite system, and a radio system.

The radioactive material detection system 10 described herein may also be reconfigured as an active sensing system in the event that the system 10 detects a nuclear anomaly within a container 12 or within a matrix 14 of sensor apparatuses 20, for example using a gamma ray or neutron generator to actively excite the container. In such an event, the sensor apparatuses 20 already in place are reconfigured into an active sensing system, at least temporarily, in order to confirm that the anomaly is not a false positive. If the containers 12 are on-board a ship 100, the ship 100 will be interdicted at sea in order to confirm that the nuclear anomaly is not a false positive or that the anomaly is being caused by actual nuclear fissile material of concern. Additional sensor apparatuses 20 can be placed near the anomalous container 12 or region within the matrix 14 of sensor apparatuses 20 where an anomaly was detected, to improve sensor resolution and data collection for the area of interest to thereby assist in the determination of whether the nuclear anomaly is a false positive or an actual threat. Since almost all containers 12 on modern container ships 100 are at least partially accessible by an inspector and the like, it is also possible to temporarily place a gamma ray or neutron generator 60 proximate to the anomalous container 12. The gamma ray or neutron generator will cause any nuclear fissile material in the area to emit gamma rays or neutrons in a spectral pattern which will assist in the confirmation of whether the nuclear anomaly is a false positive or an actual threat. Confirmation of the presence of nuclear fissile material may also be effected as described above using heat sensing thermal imaging technology, alone or in conjunction with the sensor apparatuses 20 already or temporarily in place in a region where a nuclear anomaly was detected. Additional sensitive sensor apparatuses 20 other than the sensor apparatuses 20 already in place, may be added around a suspect container 12 in order to improve sensor resolution in such an anomalous area. Any of the aforementioned techniques may be employed prior to taking interdiction action with a particular container 12, especially when the container 12 is still in transit and there is time to make sensor confirmations without moving or opening such an anomalous container 12. Thus, the radioactive material detection system 10 is reconfigurable from a passive sensing system to an at least partially active sensing system in the event that the system detects a nuclear anomaly within a cargo receptacle.

Further, the sensitivity of the radioactive material detection system 10 may be increased during particular events or for particular travel routes. For example, if there is a heightened security threat for a particular shipping route or to/from a particular destination, the sensitivity of the sensor apparatuses 20 may be increased or heightened in order to detect lower concentrations of radiation. While this may lead to a greater number of false positives, such action will also detect smaller quantities of nuclear fissile material or fissile nuclear material that is partially cloaked by shielding. The adjustment in sensitivity to the sensor apparatuses 20 may take place locally at each sensor apparatus 20, by a command from the master unit/master module 40, by a remote command from the command center 220 or by changing a setpoint at the command center 220. Preferably, the command center receives only data from the arrays 14 of sensor apparatuses 20 and the command center 220 changes the level at which a nuclear anomaly is sensed or tripped. The update or scan time of one or more of the sensor apparatuses 20, or one of the functions within one or more of the sensor apparatuses 20 could be changed, such as changing the number of updates per unit time of just the neutron sensor. As used herein, increasing the sensitivity means that a lower level of radiation will be detected and reported as a radioactive anomaly or an alarm. Such commands or orders for a heightened sensitivity may also be automatic. For example, the command center 220 may run a dynamic and/or real-time, rules-based control program which is in communication with a government or an international authority terrorist threat warning system or the like (external data 222). In the event that the threat warning system increases in level of security concern, globally or for a particular geographic region, the command center 220 will likewise issue an automatic command to radioactive material detection systems 10 globally or for radioactive material detection systems 10 within the particular geographic region, requesting that the sensitivity of the sensor apparatuses 20 be increased. Of course, such a heightened sensitivity warning system may also be implemented procedurally such that commands are issued to ships 100, trains, warehouses and the like having radioactive material detection systems 10 ordering an increase in sensitivity setting of the sensor apparatuses 20 associated therewith.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A radioactive material detection system comprising:
 a plurality of radioactive material detection apparatuses, each apparatus being disposed in or on a cargo receptacle and each apparatus comprising:
  a wireless transmitter capable of wirelessly transmitting information in correspondence with a signal;
  a radiation sensor having a sensor output, the radiation sensor being configured to detect radiation over a predetermined or commanded period of time; and
  a detection controller configured to receive the sensor output from the radiation sensor and to send the signal to the wireless transmitter for transmission; and
  an identification tag electrically coupled to one of the controller and the wireless transmitter, the identification tag being configured to provide identification data or location data to the information being transmitted by the wireless transmitter; and
 a command center configured to receive the wirelessly transmitted information directly or indirectly from each of the wireless transmitters of the plurality of radioactive material detection apparatuses, the system being configured to detect fissile or nuclear material that emits radiation by establishing a background radiation space derived from the information sensed by the plurality of radioactive material detection apparatuses to distinguish an anomaly amongst the plurality of radioactive material detection apparatuses, the system having a first sensitivity to detectable radiation and a second sensitivity to detectable radiation and being configured to be adjusted from the first sensitivity to detectable radiation to the second sensitivity to detectable radiation based on one of a remote user command, a user command at the command center and an automatic rules-based command.

2. The radioactive material detection system of claim 1, wherein the sensitivity to detectable radiation of the radioactive material detection system is increased during particular events or for particular travel routes.

3. The radioactive material detection system of claim 1, wherein the adjustment in sensitivity to detectable radiation includes adjusting one or more of the plurality of radioactive material detection apparatuses to detect lower concentrations of radiation.

4. The radioactive material detection system of claim 1, wherein the command center receives and stores a database of the information obtained from each of the plurality of radioactive material detection apparatuses, the received information from each of the plurality of radioactive material detection apparatuses being used by the command center, over time, to make adjustments for background or cosmic radiation to facilitate the identification of anomalies or unusual data which is likely to indicate the presence of radioactive material.

5. The radioactive material detection system of claim 1, wherein the radioactive material detection system is reconfigured as an active sensing system in the event that the system detects a nuclear anomaly within a cargo receptacle.

6. The radioactive material detection system of claim 5, further comprising one of a neutron generator and a gamma ray generator.

7. The radioactive material detection system of claim 1, wherein the sensitivity is adjusted by changing a number of updates per unit time of one or more of the plurality of radioactive material detection apparatuses.

8. The radioactive material detection system of claim 1, wherein the sensitivity is adjusted by changing a number of updates per unit time of at least one radiation sensor.

9. A radioactive material detection system comprising:
a plurality of radioactive material detection apparatuses, each apparatus being disposed in or on a cargo receptacle and each apparatus comprising:
  a wireless transmitter capable of wirelessly transmitting information in correspondence with a signal;
  a radiation sensor having a sensor output, the radiation sensor being configured to detect radiation over a predetermined or commanded period of time; and
  a detection controller configured to receive the sensor output from the radiation sensor and to send the signal to the wireless transmitter for transmission; and
  an identification tag electrically coupled to one of the controller and the wireless transmitter, the identification tag being configured to provide identification data or location data to the information being transmitted by the wireless transmitter; and
a command center configured to receive the wirelessly transmitted information directly or indirectly from each of the wireless transmitters of the plurality of radioactive material detection apparatuses, the system being configured to detect fissile or nuclear material that emits radiation by establishing a background radiation space derived from the information sensed by the plurality of radioactive material detection apparatuses to distinguish an anomaly amongst the plurality of radioactive material detection apparatuses, the radioactive material detection system being reconfigurable from a passive sensing system to an at least partially active sensing system based on one or more external datum accessible to the system and one of a remote user command, a user command at the command center and an automatic rules-based command.

10. The radioactive material detection system of claim 9, further comprising one of a neutron generator and a gamma ray generator.

11. A method of detecting radioactive material within a plurality of cargo receptacles using a radioactive material detection system, the radioactive material detection system including a command center and a plurality of radioactive material detection apparatuses, each apparatus having a transmitter, a detection controller and a radiation sensor configured to detect radiation over a predetermined or commanded period of time, the system having a first sensitivity to detectable radiation and a second sensitivity to detectable radiation, the method comprising:
sensing radiation at each radioactive material detection apparatus;
receiving sensed information from each radioactive material detection apparatus at the command center, over the predetermined or commanded period of time;
adjusting for background or cosmic radiation to facilitate the identification of an anomaly or unusual data which is likely to indicate the presence of nuclear radioactive material; and
adjusting from the first sensitivity to detectable radiation to the second sensitivity to detectable radiation based on one of a remote user command, a user command at the command center and an automatic rules-based command.

12. The method according to claim 11, further comprising increasing sensitivity to detectable radiation of the radioactive material detection system during particular events or for particular travel routes.

13. The method according to claim 11, further comprising reconfiguring the command center and the plurality of radioactive material detection apparatuses into an active sensing system, at least temporarily, in order to confirm that the anomaly is not a false positive.

14. The method according to claim 11, further comprising placing additional sensor apparatuses near an anomalous receptacle amongst the plurality of cargo receptacles or region within the plurality of cargo receptacles where an anomaly was detected, to improve sensor resolution and data collection for the anomalous receptacle amongst the plurality of cargo receptacles or region within the plurality of cargo receptacles where an anomaly was detected to thereby assist in the determination of whether the nuclear anomaly is a false positive or an actual threat.

15. The method according to claim 11, further comprising temporarily placing a gamma ray or neutron generator proximate to an anomalous receptacle amongst the plurality of cargo receptacles or region within the plurality of cargo receptacles where an anomaly was detected.

16. The method according to claim 11, further comprising adjusting the sensitivity of the sensor apparatuses locally at each sensor apparatus.

17. The method according to claim 11, further comprising, when the cargo receptacles are on-board a ship, the ship is interdicted at sea in order to confirm that the nuclear anomaly is not a false positive or that the anomaly is being caused by actual nuclear fissile material of concern.

18. The method according to claim 11, further comprising automatically adjusting the sensitivity of the sensor apparatuses based upon an event or setpoint processed at the command center.

19. A method of detecting radioactive material within a plurality of cargo receptacles using a radioactive material detection system, the radioactive material detection system including a command center, the method comprising:
receiving sensed information from each of a plurality of radioactive material detection apparatuses at the command center, over a predetermined or commanded period of time; and
adjusting for background or cosmic radiation to facilitate the identification of an anomaly or unusual data which is likely to indicate the presence of nuclear radioactive material, the radioactive material detection system having a first sensitivity to detectable radiation and a second sensitivity to detectable radiation; and
adjusting from the first sensitivity to detectable radiation to the second sensitivity to detectable radiation based on one of a remote user command, a user command at the command center and an automatic rules-based command.

20. The method according to claim 19, further comprising increasing sensitivity of the radioactive material detection system during particular events or for particular travel routes.

21. The method according to claim 19, further comprising reconfiguring the command center and the plurality of radioactive material detection apparatuses into an active sensing system, at least temporarily, in order to confirm that the anomaly is not a false positive.

22. The method according to claim 19, further comprising adjusting the sensitivity of the sensor apparatuses by a command from the command center or by changing a setpoint at the command center.

23. The method according to claim 19, further comprising automatically adjusting the sensitivity of the sensor apparatuses based upon an event or setpoint processed at the command center.

24. A radioactive material detection system comprising:
a plurality of radioactive material detection apparatuses, each apparatus being disposed in or on a cargo receptacle and each apparatus comprising:
a wireless transmitter capable of wirelessly transmitting information in correspondence with a signal;
a radiation sensor having a sensor output, the radiation sensor being configured to detect radiation over a predetermined or commanded period of time; and
a detection controller configured to receive the sensor output from the radiation sensor and to send the signal to the wireless transmitter for transmission; and
an identification tag electrically coupled to one of the controller and the wireless transmitter, the identification tag being configured to provide identification data or location data to the information being transmitted by the wireless transmitter; and
a command center configured to receive the wirelessly transmitted information directly or indirectly from each of the wireless transmitters of the plurality of radioactive material detection apparatuses, the system being configured to detect fissile or nuclear material that emits radiation by establishing a background radiation space derived from the information sensed by the plurality of radioactive material detection apparatuses to distinguish an anomaly amongst the plurality of radioactive material detection apparatuses, the system having a first sensitivity and a second sensitivity and being configured to be adjusted from the first sensitivity to the second sensitivity based on one or more external datum accessible to the system and one of a remote user command, a user command at the command center and an automatic rules-based command.

25. A radioactive material detection system comprising:
a plurality of radioactive material detection apparatuses, each apparatus being disposed in or on a cargo receptacle and each apparatus comprising:
a wireless transmitter capable of wirelessly transmitting information in correspondence with a signal;
a radiation sensor having a sensor output, the radiation sensor being configured to detect radiation over a predetermined or commanded period of time; and
a detection controller configured to receive the sensor output from the radiation sensor and to send the signal to the wireless transmitter for transmission; and
an identification tag electrically coupled to one of the controller and the wireless transmitter, the identification tag being configured to provide identification data or location data to the information being transmitted by the wireless transmitter; and
a command center configured to receive the wirelessly transmitted information directly or indirectly from each of the wireless transmitters of the plurality of radioactive material detection apparatuses, the system being configured to detect fissile or nuclear material that emits radiation by establishing a background radiation space derived from the information sensed by the plurality of radioactive material detection apparatuses to distinguish an anomaly amongst the plurality of radioactive material detection apparatuses, the system having a first sensitivity and a second sensitivity and being configured to be adjusted from the first sensitivity to the second sensitivity, during one of transit, an event or the detection of an events based on one of a remote user command, a user command at the command center and an automatic rules-based command.

* * * * *